United States Patent
Couse

(10) Patent No.: US 8,515,340 B2
(45) Date of Patent: Aug. 20, 2013

(54) POWER MANAGEMENT IN AN INTERNET PROTOCOL (IP) TELEPHONE

(75) Inventor: Peter Francis Couse, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 981 days.

(21) Appl. No.: 12/455,909

(22) Filed: Jun. 8, 2009

(65) Prior Publication Data

US 2010/0309904 A1 Dec. 9, 2010

(51) Int. Cl.
*H04B 3/36* (2006.01)

(52) U.S. Cl.
USPC .............................................................. 455/7

(58) Field of Classification Search
USPC ............. 370/310, 315, 316, 317, 318; 455/7, 455/11.1, 12.1, 13.3, 13.4
See application file for complete search history.

(56) References Cited

U.S. PATENT DOCUMENTS

| | | | |
|---|---|---|---|
| 7,016,707 B2 * | 3/2006 | Fujisawa et al. ............... | 455/567 |
| 2003/0147364 A1 * | 8/2003 | Watanabe et al. ............. | 370/331 |
| 2005/0105698 A1 * | 5/2005 | Patfield ....................... | 379/88.17 |
| 2006/0023698 A1 | 2/2006 | Shore et al. | |
| 2006/0116178 A1 * | 6/2006 | Vuong et al. ................... | 455/574 |
| 2008/0228955 A1 * | 9/2008 | Doan et al. ...................... | 710/16 |
| 2009/0003620 A1 * | 1/2009 | McKillop et al. ............... | 381/80 |
| 2009/0274288 A1 | 11/2009 | Ackermann-Markes | |
| 2010/0105423 A1 * | 4/2010 | Gupta ........................ | 455/550.1 |

FOREIGN PATENT DOCUMENTS

| | | |
|---|---|---|
| WO | WO 01/15416 A1 | 3/2001 |
| WO | WO 2007/033880 A1 | 3/2007 |

* cited by examiner

*Primary Examiner* — Fan Ng

(57) ABSTRACT

Power management is provided in an Internet protocol (IP) telephone and system to provide energy savings during times that the IP telephone is not in use or use is not expected. A low-power operating mode disables at least a portion of the IP telephone. The low-power operating mode may be initiated by a command received by the IP telephone from the IP telephone controller according to a schedule, which may be modified locally by the user to individualize the user's schedule. The low-power operating mode may alternatively be activated manually by a user pressing a special key, sequence or combination. The low-power operating mode is canceled upon an indication that a user either is or should be present at the IP telephone.

8 Claims, 5 Drawing Sheets

| Day | S | M | T | W | TH | F | S |
|---|---|---|---|---|---|---|---|
| Wake | 00:00 | 08:00 | 08:00 | 08:00 | 08:00 | 08:00 | 08:00 |
| Sleep | 00:00 | 18:00 | 18:00 | 18:00 | 18:00 | 18:00 | 11:00 |

POWER MANAGEMENT IN AN INTERNET PROTOCOL (IP) TELEPHONE

FIELD OF THE INVENTION

The present invention relates generally to power management and Internet protocol (IP) telephones, and more particularly, to an IP phone having power management sleep modes.

BACKGROUND OF THE INVENTION

Internet protocol (IP) telephones, also referred to as voice-over-Internet protocol (VOIP) telephones provide an alternative to subscriber-line services and equipment and to other offerings such as cable telephone and in business and hotel environments, to traditional multi-line key or PBX systems. IP telephones are increasing in popularity, due to the portability of the telephone connection and relatively low cost compared to other fixed-location services.

For office locations, an IP telephone set resembling a traditional key/PBX exchange telephone set is frequently employed as the telephone device, or in hotels, IP phones having fully-featured hotel services button sets are deployed. IP desktop telephones typically include a direct connection such as an Ethernet port, eliminating the need for another device, such as a personal computer, to interface the IP telephone to the Internet for a single connection. Relatively low-cost controllers capable of routing to multiple IP telephones further increase the flexibility and cost-savings available by using IP telephones in the office and hotel environments. As the popularity of IP telephones increases, IP desktop telephones can also expect to proliferate in the home environment, as well.

In office and hotel environments in particular, where large numbers of devices are typically left unused on weekends and more than ten hours per day on weekdays, the power consumption of personal computers and monitors is reduced by having the devices automatically enter a low power consumption state. However, typical IP telephones typically do not implement such a low-power state, as the display on the telephone generally needs to remain visible and the network connection must be maintained in order to receive an event that indicates a call has been received. The power consumed by a network interface is substantial, and the use of LAN interfaces for the IP telephone interfaces in the latest commercially-available models, further increases power consumption.

Subscriber-line telephones traditionally needed no low-power mode, as when on-hook, all of the telephone electronics is disconnected, with the exception of the ringer. While some telephones having backlit liquid-crystal (LCD) displays employ backlight dimming after some period of inactivity, telephone devices do not typically operate in a manner similar to personal computers and computer monitors.

Therefore, it would be desirable to provide an IP telephone and method for power management that conserves energy by placing the IP telephone in a low-power operating mode when full power consumption is not necessary.

SUMMARY OF THE INVENTION

Power management is provided in an Internet protocol (IP) telephone and system to provide energy savings during times that the IP telephone is not in use or use is not expected. A low-power operating mode disables at least a portion of the IP telephone. The low-power operating mode is canceled upon an indication that a user either is or should be present at the IP telephone.

The present invention is best understood by reference to the following detailed description when read in conjunction with the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

FIG. 5 is a user interface display that may be provided on the display of IP telephones 10A-10D of FIG. 1, in accordance with an embodiment of the present invention.

DETAILED DESCRIPTION

The present invention encompasses network protocol telephones and methods, including IP telephones, along with telephone systems including network protocol telephones. The network protocol telephones include power management capability in which a low-power operating mode is initiated either by a scheduled timer, a command send from a central telephone controller, an indication of proximity of a user received from some other device, activation of a special key or special key combination/sequence that places the network protocol telephone in a low-power operating mode, or the like. The telephone exits the low-power operating mode in response to user activity, an indication of user proximity received from the other device, according to a scheduled wake-up time, or the like. The above operation, in particular the scheduled operation in which large numbers of telephones in a hotel or office may be de-activated when offices or hotel rooms are unoccupied, represents a significant energy (and therefore cost) savings to a business. The features may also be used in a home or other non-controller based environment to provide energy savings, as well.

Figure 1:
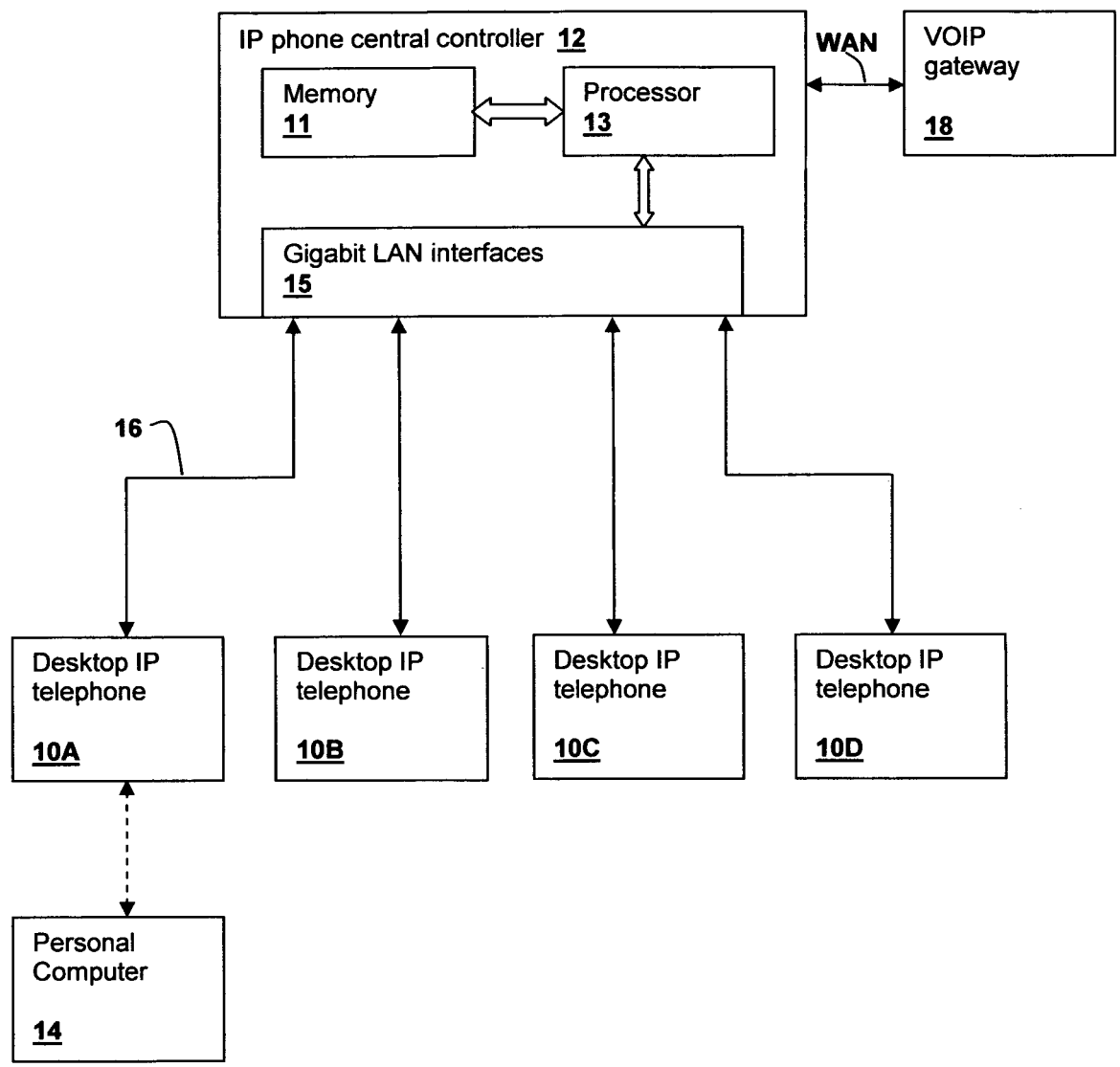
FIG. 1 is a block diagram of a telephone system in accordance with an embodiment of the present invention.

With reference now to the figures, and in particular with reference to FIG. 1, an IP telephone system in accordance with an embodiment of the present invention is shown. The depicted embodiment is not intended to be limiting, but only exemplary of the type of telephone system to which the methods and structures of the present invention may be applied. Multiple desktop IP telephones 10A-10D are coupled to an IP phone central controller 12 by individual local-area network (LAN) connections 16. The LAN connection 16 may be 10/100, gigabit connection, or the like. The LAN connection 16 is in turn coupled to a wide-area network (WAN) connection WAN, through which a remote gateway such as a voice-over Internet protocol (VOIP) gateway 18 can be addressed. As will be explained in further detail below, IP phone central controller 12, and in some embodiments personal computer 14 play a role in activating and de-activating one or more power-savings modes of desktop IP telephones 10A-10D. Program instructions are provided to implement software algorithms and are stored within a memory 11 of IP phone central controller 12. The program instructions are executed by a processor 13, to provide such functions as a scheduler and messaging functionality as described in further detail below, by communicating with IP telephones 10A-10D via LAN interfaces 15. The LAN interface 15 may be 10/100, Gigabit (10/100/1000) LAN interface, or the like.

Figure 2:
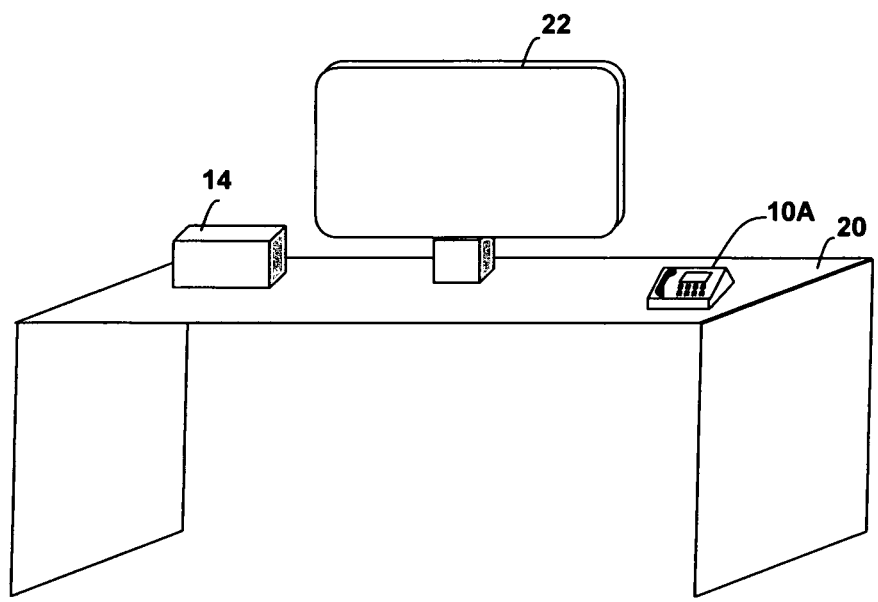
FIG. 2 is a pictorial diagram showing arrangement of components of the telephone system of FIG. 1 within a building.

Referring now to FIG. 2, an arrangement of components within the telephone system of FIG. 1 are shown in the form of an office arrangement. Personal computer 14 is connected to a monitor 22 and is proximate to desktop IP telephone 10A, e.g., personal computer 14 and desktop IP telephone 10A are located on the same desk 20 in the same office. Therefore, a "proximity" association can be made between user activity on personal computer 14 and expectations that the same user may need to operate desktop IP telephone 10A. The proximity association may alternatively be an "ownership" association, e.g., telephone 10A is used by person A and personal computer 14 is used by person A, even though they are in someone separate locations, or are surrounded by many other devices in the same location, such as in a telephone bullpen. The use of an association such as those described above in power management of desktop IP telephone 10A will be described in further detail below.

Figure 3:
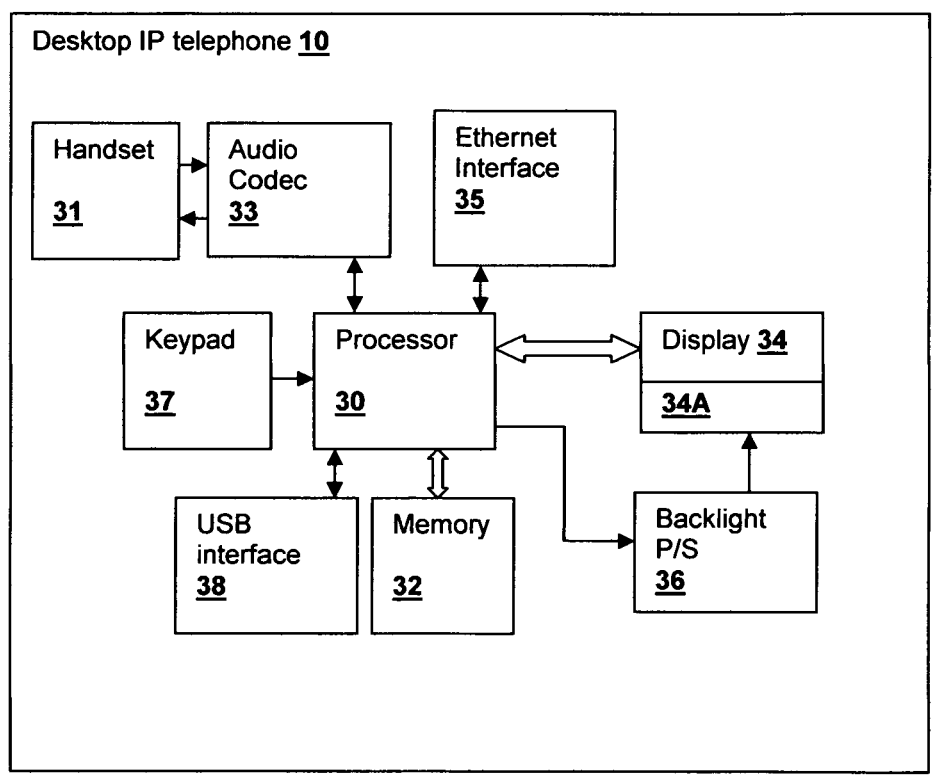
FIG. 3 is a block diagram depicting details of desktop IP telephones 10A-10D of FIG. 1.

Referring now to FIG. 3, details of a desktop IP telephone 10, which implements IP telephones 10A-10D of FIG. 1 as described above, are shown. Desktop IP telephone 10 is controlled by a processor 30 that executes program code stored in memory 32 to provide various functions of the desktop IP telephone 10. The depicted example is only illustrative and multiple processors can be provided for different functions within desktop IP telephone 10. However, a single processor implementation has been shown for clarity. A handset 31 is interfaced through an audio codec circuit 33 to processor 30 so that audio information received from a microphone in the handset can be converted by audio codec 33 to information that can be communicated over LAN 16 of FIG. 1 by Ethernet interface 35. Information received from Ethernet interface 35 is also converted by audio codec 33 to audio signals provided to an output transducer (speaker) of handset 31. Processor 30 in combination with audio codec 33, implements a protocol such as Session Initiation Protocol (SIP) or other proprietary protocol to support a telephone connection between VOIP gateway 18 and desktop IP telephone 10.

Processor 30 also controls energy management states within desktop IP telephone 10. This may include such things as disabling a backlight power supply 36 that provides power to a backlight within display 34 and sending commands to Ethernet interface 35 to place Ethernet interface 35 and the connection in a power-down state. The processor 30 may further control other power down functions including, but not limited to, disabling the display driver circuitry 34A to remove any information/text on the display 34 itself, powering down LED indicators (such as message waiting indicator), powering down audio circuitry including a digital signal processor, etc. Desktop IP telephone 10 also includes a keypad 37 for providing standard and special telephone button functionality. For example, the keypad 37 may have a button for placing the desktop IP telephone 10 in an energy savings mode. Desktop IP telephone 10 may also include a USB interface 38 or another suitable interface through which a connection can be established to another device such as personal computer 14, in order to receive proximity or absence indications as mentioned above. Such indications can also be provided via packets received at Ethernet interface 35 that originate over a network connection of personal computer 14 or from a service with which personal computer 14 is interacting, such as an Internet messaging service.

Desktop IP telephone 10 implements at least one low-power operating mode in accordance with an embodiment of the present invention, and in the exemplary embodiment described below, implements a deep sleep mode of operation in which Ethernet interface 35, display 34, backlight power supply 36, audio codec 33, and LED indicators are disabled. In accordance with one embodiment, the processor 30 and memory 32 remained powered. By keeping power to the memory 32, the desktop IP telephone 10 will not have to reboot and download software from the IP phone central controller 12 when coming out of deep sleep mode. Further, by powering the processor 30, a real time clock of the desktop IP telephone 10 can continue to function. Keypad 37 is scanned to determine if buttons are pressed (including the hook switch activated by handset 31) and processor 30 will generally enter periodic idle or sleep modes except when detecting activity, or when a wakeup timer has elapsed. The states of any deactivated devices are generally stored and then restored when the low-power operating mode is terminated. In a light sleep mode of operation, display backlight power supply 36, audio codec 33, and optionally display 34 along with any associated status LEDs are de-activated, but Ethernet Interface 35 is maintained in an active state so that desktop IP telephone 10 can be restored to full-power operating mode in response to an incoming request such as a telephone call, or other interactive function such as text notifications provided to display 34 or status changes indicated by an LED, for example when a message has been left at a hotel lobby.

Figure 4:
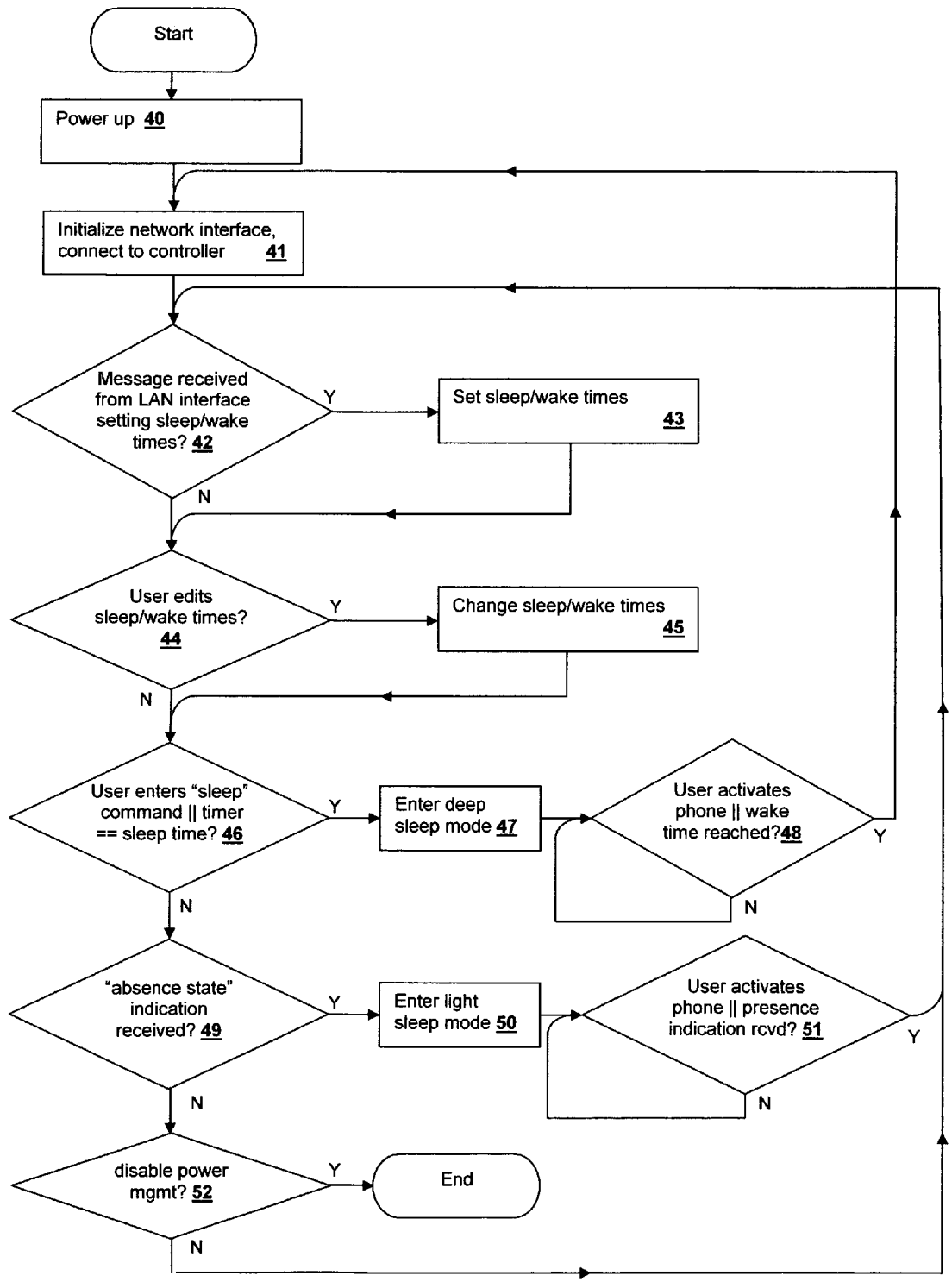
FIG. 4 is a flowchart depicting a method of operation of IP telephones 10A-10D of FIG. 1 in accordance with an embodiment of the present invention.

Referring now to FIG. 4, a method of energy management of desktop IP telephones 10A-10D in the system of FIG. 1 is shown. The IP telephones 10A-10D are initially powered-up (Step 40). Next, the network (LAN) interface of the desktop IP telephones 10A-10D are initialized and connections are established to the IP phone central controller 12 (Step 41). Upon initial power-on and connection to the IP phone central controller 12, any configuration (and/or program code) that is loaded from IP phone central controller 12 is downloaded to desktop IP telephones 10A-10D. If a message is received from the central controller 12 via the LAN interface setting sleep/wake times for desktop IP telephones 10A-10D (decision 42), the sleep/wake times are stored in IP telephones 10A-10D and the respective timers as implemented by processor 30 of FIG. 3 are set (step 43). If a user edits the sleep/wake times (decision 44) at one of desktop IP telephones 10A-10D, the values are change to customize them for the individual one of desktop IP telephones 10A-10D (step 45). In accordance with one embodiment, the user may edit the sleep/wake times (decision 44) at one of desktop IP telephones 10A-10D by pressing one or more buttons on the keypad 37 to place a specified desktop IP telephones 10A-10D in sleep mode.

If a user enters a sleep command (special key or key combo/sequence or the sleep timer is activated (decision 46)) then the corresponding one of desktop IP telephones 10A-10D enters deep sleep mode (step 47). The telephone remains in deep sleep mode (step 47) until a user activates the telephone or the wake time is reached (decision 48), at which time the above-described sequence is repeated from step 41 so that the network connection is initialized, but a state bit, generally provided by processor 30, differentiates from a pure power up restart, so that step 40 is not repeated when exiting the deep sleep mode.

In the illustrative example, light sleep mode (step 50) is activated in response to an indication that the user is absent from the telephone location, for example by an Internet messenger presence state that indicates the user is absent (decision 49). A resident application may be provided on personal computer 14 to poll for the presence information and send it to an application programming interface (API) of the telephone. Alternatively USB interface 38 of FIG. 3 might be coupled to personal computer 14 of FIG. 1 and receive a power management or other presence indication that indicates to desktop IP telephone 10A that the low-power operating mode should be activated or deactivated. The light sleep mode is maintained until the user activates the telephone or the presence status changes to "present" (step 51). Unless the power management scheme is disabled (step 52), the process of steps 40-52 is repeated.

In the event that power is lost to the IP telephone 10A-10D during the deep or light sleep mode, the IP telephone 10A-10D will power up to full operating state when power is restored by repeating the above sequence starting at step 41.

The above-depicted flow is only one example of a combination of deep sleep and light sleep modes that may be implemented in accordance with the present invention. The particular communications, actions or timeouts that cause activation and de-activation of the low-power operating modes as depicted above are not limiting and other combinations are contemplated by the present invention, including activation/deactivation of the light sleep mode by manual means. In the context of the present invention, it is understood that "low-power operating mode" indicates both light and deep sleep modes, and that the telephone does not need to be "operating", at least with respect to providing voice connections or network connections in order to be in an "operating mode", including the low-power operating mode(s) of the present invention.

Referring now to FIG. 5, a user interface that may be provided by a table 60 displayed on display 34 of FIG. 3 and interacted with via keypad 37 of FIG. 3 is shown. The depicted table 60 shows a set of Wake times and Sleep times in 24-hour format that can be transmitted from IP phone central controller 12 and customized (via keypad 37) at each individual IP telephone by the corresponding user. Such customization permits, for example in an office scenario, a worker to set their desktop IP telephone to be active during the times they are usually present at work. Alternatively, table 60 might form part of an HTML page served by an IP telephone and accessible via personal computer 14, either via the LAN or via USB interface 38 to provide editing of the Wake and Sleep times, as well as other features of the telephone. Further, via any of the user interfaces above, it is contemplated that the user may customize the low-power operating modes so that the particular features disabled for each mode may be set by the user. For example, in one system or station it might be necessary or desirable to disable only the backlight in deep sleep mode, but leave the display active without the backlight. In another application, or at another telephone station, might be acceptable to disable both the display and the backlight in deep sleep mode.

While the Sleep and Wake functions can be commanded by timer values as described above, the Sleep time may be immediate or "now", as provided by a special command or time value. Such a command is very useful in hotel applications, in which a property management system (PMS) may be coupled to the telephone system. The PMS can provide indications to IP phone central controller 12 or to individual IP telephones 10A-10D that certain rooms are occupied/unoccupied and therefore the telephones in unoccupied rooms can be placed in deep sleep mode.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A method of operation of a desktop network protocol telephone set coupled to a local area network by a network interface, comprising:
    first receiving first network transmissions from the local area network corresponding to received audio signals;
    first converting the first network transmissions to a first audio signal provided to a handset of the telephone set;
    second receiving a second audio signal from the handset;
    second converting the second audio signal to second network transmissions and providing them to the network interface;
    third receiving an indication that a user of the telephone set is not expected to be or is not in proximity to the telephone set;
    selecting between a full power operating mode of the telephone set and a low-power operating mode of the telephone set in response to the indication received by the third receiving, wherein selection of the low-power operating mode disables at least a portion of the telephone set and occurs when the third receiving receives a message from a central network telephone controller via the network interface that indicates a sleep time at which the user is expected to be away from the telephone set.

2. The method of claim 1, wherein the telephone set includes a display having a backlight, wherein the selecting further selects between a first low-power operating mode as the low-power operating mode and a second low-power operating mode, wherein in the first low-power operating mode the network interface is enabled and the backlight is disabled, and wherein in the second low-power operating mode both the network interface and the backlight are disabled.

3. The method of claim 2, wherein in the second low-power operating mode at least one of LED indicators, display circuitry, or audio circuitry is further disabled.

4. The method of claim 1, wherein the message further includes a wake time for the telephone set to exit the low-power operating mode, and wherein the method further comprises:
    determining when the wake time has been reached; and
    exiting the low-power operating mode in response to the determining that the wake time has been reached.

5. The method of claim 4, further comprising:
    providing an interactive editor using a display of the telephone set;
    receiving user input for changing at least one of the wake time or the sleep time; and
    modifying the at least one of the wake time or the sleep time in conformity with the user input.

6. The method of claim 1, wherein the sleep time is an immediate sleep time, and wherein the method further comprises interpreting the message as a command to enter the low-power operating mode without delay.

7. The method of claim 1, wherein the third receiving receives a user input selecting the low-power operating mode, and wherein the selecting is performed in response to receiving the user input.

8. The method of claim 1, wherein the third receiving receives a communication from a personal computer coupled to the telephone set and located proximate the telephone set, wherein the communication provides the indication that the user of the telephone set is not expected to be or is not in proximity to the telephone set.

* * * * *